United States Patent
Franck

(10) Patent No.: US 6,847,174 B2
(45) Date of Patent: Jan. 25, 2005

(54) DRIVE FOR A HALF-BRIDGE INVERTER

(75) Inventor: Felix Franck, München (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 17 days.

(21) Appl. No.: 10/606,793

(22) Filed: Jun. 27, 2003

(65) Prior Publication Data

US 2004/0080969 A1 Apr. 29, 2004

(30) Foreign Application Priority Data

Jul. 2, 2002 (DE) .......................................... 102 29 633

(51) Int. Cl.[7] .............................................. H05B 37/02
(52) U.S. Cl. .............. 315/209 R; 315/215; 315/DIG. 7
(58) Field of Search .............................. 315/209 R, 211, 315/214, 215, 224, 225, 360, 307, DIG. 7; H05B 37/02

(56) References Cited

U.S. PATENT DOCUMENTS

| | | | | |
|---|---|---|---|---|
| 5,068,571 A | * | 11/1991 | Schoofs | 315/205 |
| 5,550,436 A | | 8/1996 | Houk | 315/209 K |
| 6,002,213 A | * | 12/1999 | Wood | 315/307 |
| 6,744,219 B2 | * | 6/2004 | Neidlinger | 315/224 |

* cited by examiner

*Primary Examiner*—Don Wong
*Assistant Examiner*—Trinh Vo Dinh

(57) ABSTRACT

The selection of the dead time in the case of a half-bridge inverter influences the efficiency thereof. The optimal dead time, and thus the optimal switching-on time of a lower half-bridge transistor (T2) is accomplished according to the invention by virtue of the fact that switching on is delayed until the current in a level shift transistor (T3) has dropped below a given threshold. A further aspect of the invention consists in that the delay in switching on the lower half-bridge transistor (T2) is immediately suppressed whenever a charging current flows in a trapezoidal capacitor, and this is accompanied by the rise of the half-bridge output voltage (UHB) after the traversal of a minimum.

12 Claims, 4 Drawing Sheets

-- Prior Art --

DRIVE FOR A HALF-BRIDGE INVERTER

TECHNICAL FIELD

The invention proceeds from a half-bridge inverter with the following features:

The half-bridge inverter is connected to a positive pole and a negative pole of a power supply.

an upper and a lower half-bridge switch (T1, T2) that respectively have a control input, a working electrode and a reference electrode, the upper half-bridge switch being coupled with its working electrode to the positive pole, and the lower half-bridge switch being coupled with its reference electrode to the negative pole, a control module that outputs at a control output a rectangular control signal that can have a low state and a high state, and a level shift switch that is coupled to the negative pole and is controlled by the control module The invention relates to the generation of an optimal dead time in which none of two half-bridge switches may be switched on.

BACKGROUND ART

Half-bridge inverters are sufficiently well known for generating an ac voltage from a dc voltage. They are widely used in switched-mode power supplies (SMPS) Since the half-bridge inverter is cost effective with reference to other switched-mode power supply topologies (for example full-bridge inverters), it is dominant, in particular, in cost-sensitive areas such as lighting engineering. Electronic operating units for fluorescent lamps or halogen incandescent lamps are virtually exclusively equipped with half-bridge inverters.

A half-bridge inverter essentially comprises the series circuit of an upper and a lower half-bridge switch that is connected to a power supply that essentially constitutes a dc voltage with a positive pole and a negative pole. This is a rectified line voltage in the simplest case. Provided at the tie point of the half-bridge switches is a half-bridge output voltage UHB which has a substantial ac voltage component and feeds a load circuit that picks a load current IL. In the case of lighting engineering, the load circuit essentially comprises a reactance network with one or more lamps as energy consumers.

In general, two half-bridge switches are designed as electronic switches such as, for example, MOSFET, bipolar transistor or IGBT. For technical reasons relating to semiconductors, it is mostly N channel or NPN transistors that are used in power electronics, for which reason the following statements deal with this type of transistor. However, it is also possible throughout to use transistors complementary thereto. All that need be done is to invert the polarity of the power supply and, where appropriate, the drive of the transistors. In the case of N-channel or NPN-transistors, the upper half-bridge switch is coupled to the positive pole, and the lower transistor is coupled to the negative pole, the negative pole constituting a reference potential for the entire circuit arrangement including the half-bridge inverter. This also explains the designations of upper and lower half-bridge switch: the upper half-bridge switch is at a higher potential than the lower half-bridge switch in relation to the reference potential, at least during the time it is switched on.

It must be avoided in any case that the two half-bridge switches are switched on simultaneously, since otherwise the power supply is short circuited. However, there is inserted between the phases in which one of the two half-bridge switches is switched on a phase in which none of the two half-bridge switches is switched on. This phase is termed dead time in the literature. The dead time has the function not only of creating a safety gap between the switched-on phases of the half-bridge switches, but rather the tie point of the half-bridge switches is to be given the opportunity to change its potential during the dead time. The energy that is stored in the load circuit, and largely in inductive components there, is capable of eliminating, or at least minimizing, the voltage at the half-bridge switch that is switched on after the dead time. Consequently, the relevant half-bridge switch can be switched on without losses or at least with the minimum possible loss. This state of affairs is also denoted in the literature as zero voltage switching (ZVS). The time that passes until the tie point of the half-bridge switches has assumed a potential that ensures minimal switch-on losses is denoted below as the reversal time.

The electronic switches used as half-bridge switches generally have a working electrode (for example drain, collector), a reference electrode (for example source, emitter) and a control electrode (for example gate, base). The control electrode forms a control input of the half-bridge switch. The switch is generally switched on by a drive signal that is present between the control electrode and reference electrode. FIG. 1 illustrates a prior art relating to how the drive signals are provided for the half-bridge switches.

The half-bridge switches T1 and T2 are designed as MOSFETs in FIG. 1. The upper half-bridge switch T1 is connected in series with the lower half-bridge switch T2. The drain terminal of the upper half-bridge switch T1 is connected to the tie point J3, to which the positive pole of the power supply is connected. The source terminal of the lower half-bridge switch T2 is connected to the tie point J1, to which the negative pole of the power supply is connected. As may be seen from FIG. 1, the potential of J1 forms a reference potential for the half-bridge inverter shown. The source terminal of T1 and the drain terminal of T2 are connected and are fed to the tie point J2 that forms the half-bridge output. At J2, the half-bridge inverter supplies a half-bridge output voltage UHB to a load circuit. The driving of the gate terminals of T1 and T2 is described below as it corresponds to the prior art and is illustrated in FIG. 1.

A control module 1 that is supplied with energy via the tie point J4 of an auxiliary voltage supply makes a rectangular control signal available at its control output 2. The form of the control signal corresponds to the inverse of the desired form of the half-bridge output voltage UHB. The control signal can assume a low state and a high state. The intention is that the upper half-bridge switch T1 is switched on in the low state of the control signal, and the lower half-bridge switch T2 is switched on in the high state. The control signal is connected to the gate of the lower half-bridge switch T2 via the parallel circuit of a resistor R1 and a diode D1. Consequently, the voltage value of the control signal in a high state must be at least as great as the gate/source voltage that is required for switching on the lower half-bridge switch T2. The voltage value of the control signal in the low state must be lower than the minimum value that is required for the relevant gate/source voltage for switching on. The resistor R1 effects a switching-on delay for T2 that is bridged by the diode D1 in order to switch off T2.

Providing the drive signal for the upper half-bridge transistor T1 is more complicated, since the reference electrode of T1 is not at the same potential as the reference potential of the control module. In accordance with FIG. 1, an upper drive circuit 3 is provided for the upper half-bridge transistor T1. In the simplest case, this drive circuit comprises a totem pole circuit known from the literature. The output of the upper drive circuit is connected to the gate of the upper half-bridge transistor T1. The energy for the upper drive circuit is fed via the terminals 4 and 5, the terminal 5 also constituting the reference potential for the output of the upper drive circuit, and an operating voltage of the upper drive circuit being required at the terminal 4. The energy supply for the upper drive circuit is implemented by a known pump circuit comprising the capacitor C1 and the diode D2. C1 and D2 are connected in series between the auxiliary voltage supply at the tie point J4 and the half-bridge output at the tie point J2. The energy for the upper drive circuit is drawn from the capacitor C1.

The input of the upper drive circuit 6 is connected via a pull up resistor R2 to the terminal 4 of the upper drive circuit, at which the operating voltage thereof is present. Without further measures, the pull up resistor R2 is led to a control signal for an upper half-bridge transistor that switches the latter on. It is therefore necessary to ensure that the upper half-bridge transistor T1 is switched off in the high state of the control signal from the control module. A level shift switch T3 fulfills this purpose. It is designed in FIG. 1 as a MOSFET whose drain terminal is connected to the input of the upper drive circuit 6, whose gate terminal is connected to the control output of the control module 2, and whose source terminal is connected, via a current negative feedback resistor R3, to the reference potential of the half-bridge inverter. The level shift switch T3 is switched on in the high state of the control signal, as a result of which the voltage at the input of the upper drive circuit 6 is reduced to a value that causes the upper half-bridge transistor T1 to be switched off. The drain terminal of the level shift switch T3 is additionally connected to the half-bridge output J2 via a diode D3. This prevents a current from flowing through the upper drive circuit when the level shift switch T3 is switched on. D3 is preferably designed as a Schottky diode, in order to keep low a forward voltage that occurs. The current negative feedback resistor R3 is intended to limit the current through the level shift switch T3.

In the case of the circuit described, a switching-on delay of the upper half-bridge transistor T1 is provided by virtue of the fact that the Miller capacitance of T3 must be charged via R2 after T3 has been switched off. The upper half-bridge transistor T1 is not switched on until the voltage across this Miller capacitance exceeds a given threshold value at the input 6 of the upper drive circuit. Thus, the desired dead time that passes between switching off the lower half-bridge transistor T2 and switching on the upper half-bridge transistor T1 can be set by the value of the pull up resistor R2.

The switching-on delay for the lower half-bridge transistor T2 cannot be implemented in this way. Only the resistor R1 offers the possibility of modifying the charging time of the gate/source capacitance of the lower half-bridge transistor T2. However, it is possible thereby to realize only dead times that are shorter than the above named reversal time. Longer dead times would cause the lower half-bridge transistor T2 to be operated too long in the so-called linear working range in which very large losses occur.

Document U.S. Pat. No. 5,550,436 (Houk) describes a dead time generation for the transition from the upper to the lower half-bridge transistor by means of a switching-on delay unit (LSDELAY) for the lower half-bridge transistor. However, this solution has two disadvantages: firstly, the said switching-on delay unit forms a part of an integrated circuit, and this means a substantial outlay on costs; secondly the dead time is fixed for a given dimensioning and does not match the above named reversal time. Consequently, the dead time must always be longer than the optimal dead time, and this leads to losses in efficiency of the half-bridge converter.

DISCLOSURE OF THE INVENTION

It is an object of the present invention to provide a half-bridge inverter in accordance with the preamble of claim 1 which provides an optimal dead time cost effectively.

This object is achieved by means of a half-bridge inverter having the features of the preamble of claim 1 by means of the features of the characterizing part of claim 1. Particularly advantageous refinements are to be found in the dependent claims.

According to the invention, the control input of the lower half-bridge switch is coupled to the control output of a control module via an interrupt initiation switch. The high state of the control signal thereof can therefore not lead directly to switching on the lower half-bridge transistor. Rather, this first requires the interrupt initiation switch to be switched on. Thus, the switching on of the lower half-bridge transistor can be delayed with the aid of the interrupt initiation switch until the reversal time has elapsed.

An indicator that the reversal time has elapsed is formed according to the invention by the current through a level shift switch. If the control signal at the control output of the control module goes over to the high state, the level shift switch is firstly switched on. Since at this instant the half-bridge output is at the positive potential of the power supply, there firstly flows through the level shift switch a high current that is essentially limited by a current negative feedback resistor. As long as this current is above a prescribed threshold, the interrupt initiation switch is switched off in accordance with the invention, and the lower half-bridge switch is not driven. After the above described reversal operation of the half-bridge, the potential of the half-bridge output is at the potential of the reference potential, or the negative pole. At this instant, the current through the level shift switch is essentially determined by the pull up resistor. This is low by comparison with the current when the level shift switch is being switched on, and is below the above named prescribed threshold. Upon undershooting of the threshold, the interrupt initiation switch is switched on in accordance with the invention, and the control module can switch on the lower half-bridge switch. The invention therefore ensures with a low outlay that the dead time during the transition of the conductivity from the upper to the lower transistor always corresponds to the reversal time.

The control of the interruption initiation switch by the current that flows in the level shift switch can be performed according to the invention by means of a time delay switch. In this case, the interrupt initiation switch is driven by the control module. That is to say, the control module outputs a control signal which is capable in principle of switching on the interrupt initiation switch simultaneously with the level shift switch. This is prevented by the time delay switch, for which purpose the latter blocks the control input of the interrupt initiation switch until the current through the level shift switch has fallen below the given threshold.

A further aspect of the invention is grounded in the reversal operation of the half-bridge. In order when switching off a half-bridge switch to delay the voltage rise at the relevant half-bridge switch, and thus to reduce the switch-off losses, it is known to connect a so-called trapezoidal capacitor in parallel with the half-bridge switch. With the same effect, the trapezoidal capacitor can be connected in parallel with the upper or with the lower half-bridge switch.

FIG. 5 serves to explain a reversal operation. The lower part of FIG. 5 shows the time characteristic of the half-bridge output voltage UHB referred to the negative pole of the power supply (reference potential). This voltage corresponds to the voltage at the lower half-bridge transistor between its working electrode (drain) and its reference electrode (source). The upper part shows a corresponding load current IL. The upper half-bridge transistor T1 is switched on during the time t1. Over this time, UHB has a high value that corresponds to the voltage that is supplied by the power supply. The lower half-bridge transistor T2 is switched on during the time t2. Over this time, UHB has a value that is near to zero. The dead time tt, in which none of the two half-bridge transistors are switched on, lies between the time sections t1 and t2. It is seen in FIG. 5 that during the time tt the value of the voltage UHB drops to zero, and the lower half-bridge transistor T2 can be switched on in a loss-free fashion. The characteristic of the voltage UHB during the dead time tt is a function of the value of the trapezoidal capacitor and of the load current IL. The load current IL must be capable of discharging the trapezoidal capacitor or of charging it to the value of the voltage of the power supply.

This is not always achieved in the case of unfavorable configurations. Such a case is illustrated in FIG. 6. As in FIG. 5, the time characteristic of the voltage at the half-bridge output UHB is illustrated, as is that of the load current IL. While the value of UHB initially decreases after the upper half-bridge transistor T1 is switched off, it does not give the value of zero, but rises again after traversing a minimum and goes over into a periodic oscillation. The load current IL is too small in this case to be capable of fully discharging the trapezoidal capacitor. According to the invention, the dead time tt is selected such that the lower half-bridge transistor T2 is switched on whenever the voltage UHB is minimal. In this case, the switch-on losses of T2 are not zero, because it must switch on to a residual voltage of UR. However, the switch-on losses are minimized by the inventive selection of the dead time tt. When T2 is switched on, the value of UHB naturally drops to zero. The characteristics of UHB and IL should T2 not be switched on are depicted in FIG. 6 by dashes.

The detection of the minimum value of UHB constitutes a problem. According to the invention, the current through the trapezoidal capacitor is used for this purpose. An apparatus for acquiring the current through the trapezoidal capacitor establishes from which instant the trapezoidal capacitor is not further discharged but is recharged again. Starting from this instant, current flows from the half-bridge output, that is to say from the tie point of the half-bridge transistors, to the trapezoidal capacitor. According to the invention, the apparatus for acquiring the current through the trapezoidal capacitor cancels the blocking of the control input of the interrupt initiation switch at this instant, and thereby enables the lower half-bridge transistor T2 to be driven.

In the case as described in FIG. 5, the acquisition of the current through the trapezoidal capacitor remains ineffective. Rather, as described above, the lower half-bridge transistor T2 is switched on whenever current through the level shift resistor drops below a given threshold because the half-bridge output voltage UHB has dropped to zero.

BRIEF DESCRIPTION OF THE DRAWINGS

The aim below is to explain the invention in more detail with the aid of exemplary embodiments and with reference to drawings, in which.

Resistors are denoted below by the letter R, transistors by the letter T, diodes by the letter D, and tie points by the letter J, followed by a number in each case. Again, identical reference symbols are used throughout below for identical elements and those of identical effects in the various exemplary embodiments.

BEST MODE FOR CARRYING OUT THE INVENTION

Figure 1:
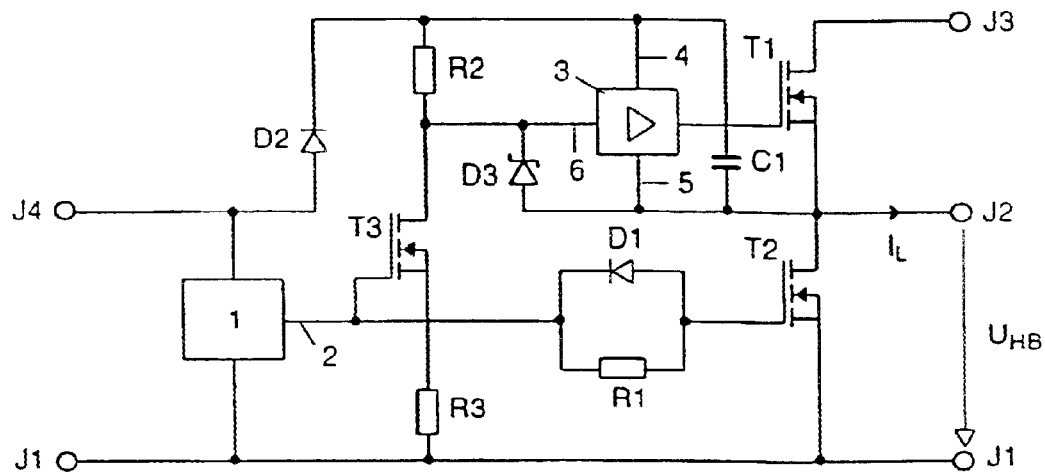
FIG. 1 shows a half-bridge inverter in accordance with the prior art.
Figure 2:
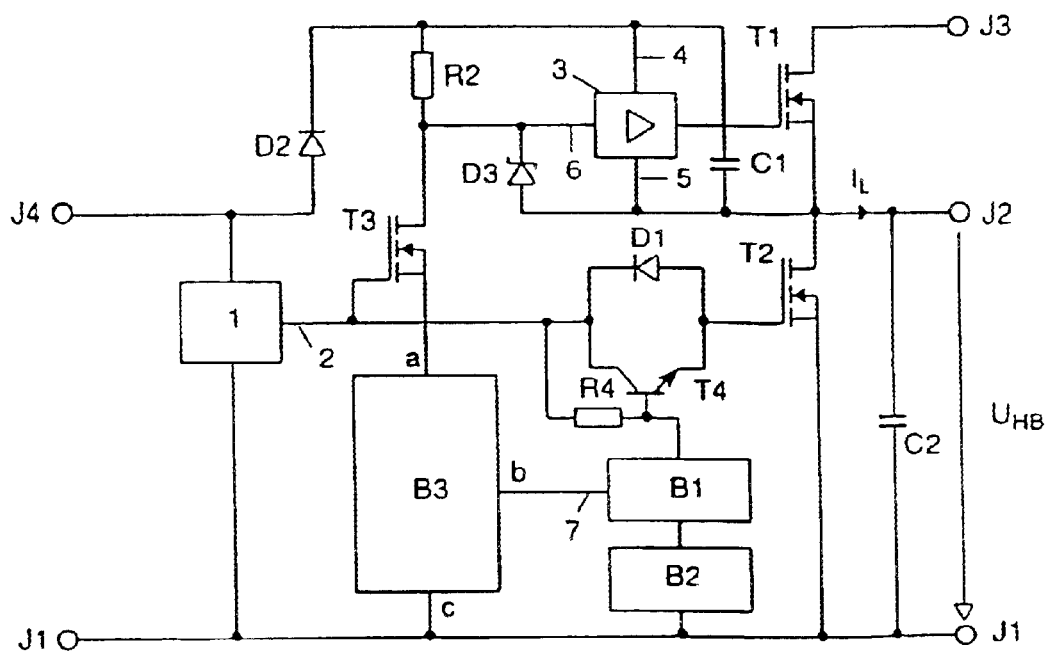
FIG. 2 shows an exemplary embodiment of a half-bridge inverter according to the invention.

FIG. 2 illustrates an exemplary embodiment of an inventive half-bridge inverter. The components, described in FIG. 1, of a half-bridge inverter, and their mode of operation as they are known in the prior art are not set forth again below. By contrast with a half-bridge inverter according to the prior art, the control output 2 of the control module 1 is connected to the control electrode of the lower half-bridge switch T2 not via the resistor R1, but according to the invention via an interrupt initiation switch T4. T4 is designed as an NPN bipolar transistor, but could be replaced in principle by any desired electronic switch. The working electrode of the interrupt initiation switch T4, the collector of T4 in the example, is connected to the control output 2 of the control module 1. The reference electrode of the interrupt initiation switch T4, the emitter of T4 in the example, is connected to the control electrode of the lower half-bridge switch T2. A drive resistor R4 is connected between the control electrode of the interrupt initiation switch T4, the base of T4 in the example, and the collector of T4. The base of T4 is connected to the negative pole of the power supply J1 via the blocks B1, B2. The block B1 includes the above described time delay switch, and the block B2 includes a current negative feedback network for the time delay switch. The block B1 has a control input 7 into which, according to the invention, a signal proportional to the current through the level shift switch T3 is fed. This signal is provided in the exemplary embodiment of FIG. 2 by a current measuring apparatus that is implemented by a block B3 with a measuring output b. The block B3 additionally has the terminals a and c. By contrast with FIG. 1, the current negative feedback resistor R3 is replaced by the block 3 with the terminals a and c. Consequently, between the terminals a and c the block 3 fulfills a current negative feedback property for the level shift switch T3. Provided at the measuring output b of the block 3 is a signal that is proportional to the current from the terminal a to c, and thus to the current through the level shift switch T3. The measuring output b of the block 3 is collected to the control input 7 of the block 1.

The interrupt initiation switch T4 is driven by the control signal of the control module 1 via the drive resistor R4. If the control signal changes to a high state, the time delay switch in the block B1 is, however, switched on because of the high current in the level shift switch, and thereby blocks the control input of the interrupt initiation switch T4. In the exemplary embodiment in accordance with FIG. 2, this means that the base of T4 is pulled by the time delay switch up to the reference potential, specifically the negative pole of the power supply J1. As soon as the time delay switch B1 is switched off because of the drop in current through the level shift switch T3, the interrupt initiation switch T4 is switched on via the drive resistor R4.

By comparison with FIG. 1, in FIG. 2 a trapezoidal capacitor C2 is also connected in parallel with the output voltage of the half-bridge UHB.

Figure 3A:
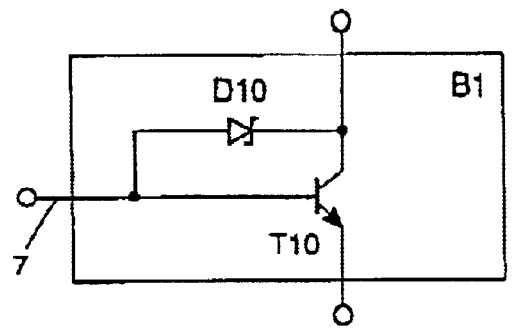
FIG. 3 shows
 a) an exemplary embodiment of a time delay switch,
 b) a further exemplary embodiment of a time delay switch,
 c) an exemplary embodiment of a current negative feedback network,
 d) an exemplary embodiment of a block that accomplishes the current negative feedback of the level shift switch, and the control of the time delay switch and
 e) a further exemplary embodiment of a block that accomplishes the current negative feedback of the level shift switch, and the control of the time delay switch.

FIG. 3a gives an example of the design of the block B1, the time delay switch, of FIG. 2. This is essentially an NPN bipolar transistor T10. The control electrode thereof, the base, forms the control input 7 of the block B1. The reference electrode, the emitter, is connected to the block B2, a current negative feedback network. The working electrode, the collector, is connected to the control electrode of the interrupt initiation switch T4. Connected between the base and collector as an antisaturation measure known from the literature is a diode D10 that is preferably designed as a Schottky diode.

Figure 3B:
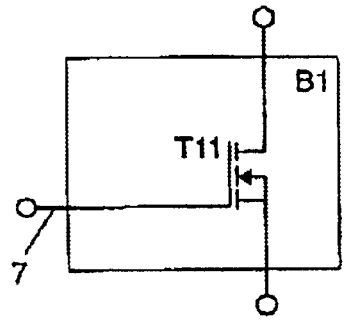

A further example of the design of the block B1, the time delay switch, of FIG. 2 is given in FIG. 3b. By comparison with FIG. 3a, the bipolar transistor T10 is replaced by the MOSFET T11. No antisaturation measures are provided, because of the properties of a MOSFET.

Figure 3C:
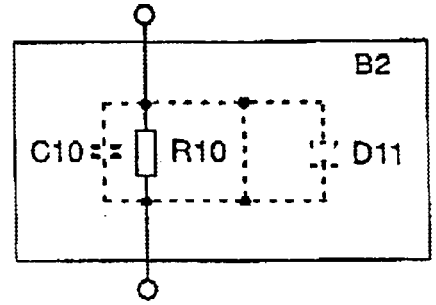

An example of the design of the block B2, a current negative feedback network, of FIG. 2 is given in FIG. 3c. In the simplest case, the current negative feedback network comprises a resistor R10 that can also assume the value zero, as is indicated by the dashed short circuit via R10. In this case, however, the switch-on threshold or the time delay switch is subject to strong manufacturing tolerances and a strong temperature dependence. A capacitor C10 can be connected in parallel with R10 in order to model the dynamic properties of the current negative feedback network. Rapid changes at the control input 7 of the block B1 have a stronger effect than slow changes, owing to the use of a capacitor C10. This can be desirable in order for the time delay switch in block B1 to switch on upon changing to the high state before the interrupt initiation switch is switched on via R4.

As indicated by dashes in FIG. 3c, it is also possible to use a diode D11 instead of the resistor R10. It is possible thereby to lend the time delay switch in the block B1 a nonlinear switch-on characteristic. It is thereby possible to avoid a reaction of the time delay switch on currents in the level shift switch below a given threshold.

Figure 3D:
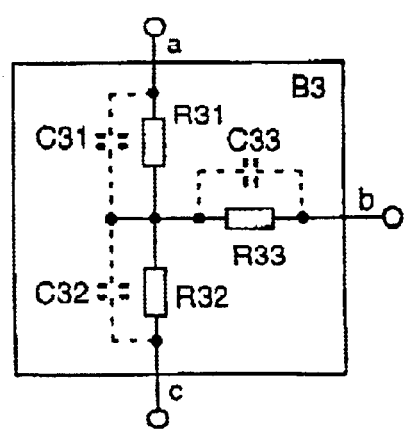

FIG. 3d illustrates an exemplary embodiment for the block B3 that accomplishes the current negative feedback of the level shift switch and the control of the time delay switch. A series circuit of two resistors R31 and R32 is connected between the terminals a and c. The voltage at the tie point of R31 and R32 with reference to the terminal c, that is to say the voltage across the resistor R32, constitutes a measure of the current through the level shift switch T3, and is fed to the measurement output b of the block B3 via a resistor R33.

The ratio of the resistance values of R31 and R32 can be used to set a threshold that stipulates how low the current through the level shift switch T3 must be for the time delay switch in the block B1 to be switched off. This ratio is to be selected such that the time delay switch in the block B1 is switched off when the output voltage of the half-bridge UHB has dropped to the potential of the negative pole of the supply voltage J1. The resistor R33 serves for decoupling the current acquisition through R31 and R32 from the evaluation via the measurement output b and control input 7 in the block B1. If the block B1 includes a MOSFET T11 in accordance with FIG. 3b, the decoupling mentioned above already results by virtue of the high impedance at the control input 7, and R33 can assume the value zero. If the block B1 includes a bipolar transistor T10 in accordance with FIG. 3a, the value of R33 is to be selected to be so large that, firstly, the current acquisition is not substantially influenced, and, the signal present at the control input 7 does not overdrive the bipolar transistor T10, something which would delay switching off T10.

The capacitors C31, C32 and C33 are depicted in parallel with R31, R32 and R33 by dashes in FIG. 3d. They can be used optionally in order to influence the dynamic properties of the threshold described.

Figure 3E:
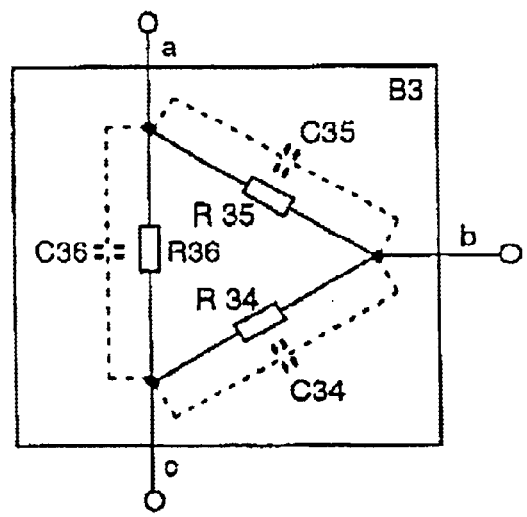

FIG. 3e illustrates a further exemplary embodiment of the block B3 that accomplishes the current negative feedback of the level shift switch, and the control of the time delay switch. The circuit in FIG. 3e can be derived from the circuit in FIG. 3d by means of the known star/delta transformation for electric networks. To this extent, the two exemplary embodiments of FIGS. 3d and 3e are equivalent. If a capacitor C35 is used, the result for R35 can be such a high value that it can be omitted altogether.

Figure 4:
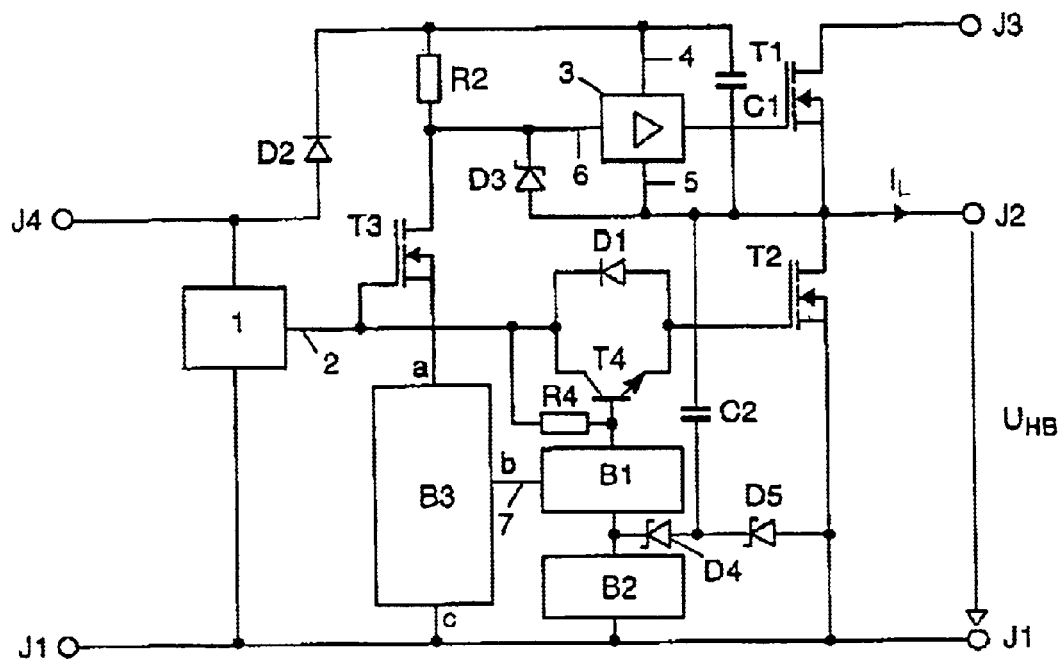
FIG. 4 shows an exemplary embodiment of an inventive half-bridge inverter with detection of the minimum in the half-bridge output voltage.
Figure 5:
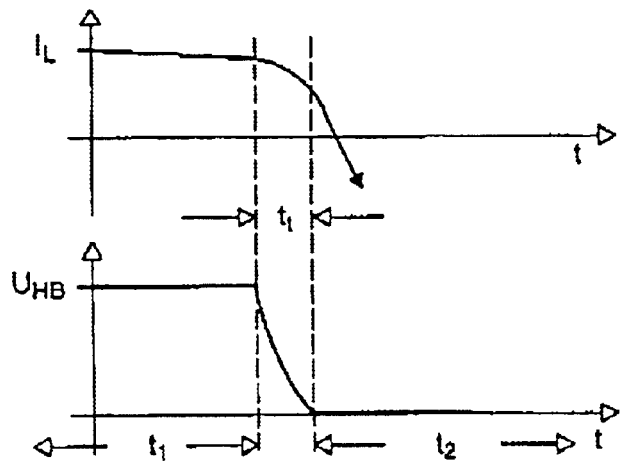
FIG. 5 shows an example of the time characteristic of a half-bridge output voltage, and of a load current without switch-on losses.
Figure 6:
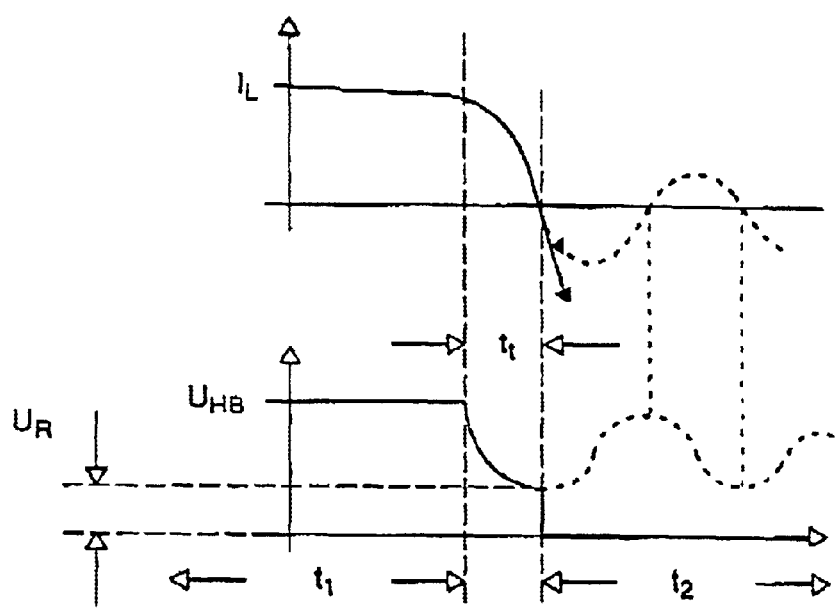
FIG. 6 shows an example of the time characteristic of a half-bridge output voltage, and of a load current with minimized switch-on losses.

FIG. 4 represents an exemplary embodiment for a half-bridge inverter that, in accordance with the invention, detects the minimum in the half-bridge output voltage UHB. By comparison with FIG. 2, the series circuit of two diodes D4 and D5 is connected in parallel with the block B2. The trapezoidal capacitor C2 is connected not directly to the reference potential J1, but to the tie point of D4 and D5. Together with the block B2, D4 and D5 constitute an apparatus for acquiring the current through the trapezoidal capacitor. At the instant when the upper half-bridge switch T1 is switched off, the trapezoidal capacitor is charged and begins to be discharged by the load current IL via the diode D5. If the load current IL does not succeed in completely discharging the trapezoidal capacitor, the load current IL changes polarity as indicated by reactances included in the load circuit. At this instant, a recharging operation of the trapezoidal capacitor C2 begins via the diode D4 and the block B2. The resulting voltage drop across the block B2 raises the potential of the reference electrode of the time delay switch in the block B1. According to the invention, the result of this is to switch off the time delay switch in the block B1. The blocking of the control input of the interrupt initiation switch T4 by the time delay switch in the block B1 is thereby canceled, and the interrupt initiation switch T4 is switched on by the control module 1 via the resistor R4. According to the invention, the operation described succeeds in switching on the lower half-bridge transistor T2 at the minimum in the half-bridge output voltage UHB. It is preferred to use Schottky diodes for the diodes D4 and D5 in order to keep the forward voltages low, the result being to enable early detection of the minimum in the half-bridge output voltage UHB.

The above statements relate throughout to half-bridge inverters. However, the inventive ideas can also be transferred to full-bridge inverters.

What is claimed is:

1. A half-bridge inverter, having the following features:
   the half-bridge inverter is connected to a positive pole and a negative pole of a power supply,
   an upper and a lower half-bridge switch (T1, T2) that respectively have a control input, a working electrode and a reference electrode, the upper half-bridge switch being coupled with its working electrode to the positive pole, and the lower half-bridge switch being coupled with its reference electrode to the negative pole,
   a control module that outputs at a control output a rectangular control signal that can have a low state and a high state, and
   a level shift switch that is coupled to the negative pole and is controlled by the control module
   the control output of the control module is coupled via an interrupt initiation switch to the control input of the lower half-bridge switch, and
   the interrupt initiation switch is controlled by the current through the level shift switch in such a way that the interrupt initiation switch is switched on only whenever the current through the level shift switch is below a given threshold.

2. The half-bridge inverter as claimed in claim 1, wherein the interrupt initiation switch has a control input that is coupled to the control output of the control module, and is coupled to a time-delay switch that is controlled by the current through the level shift switch and blocks the control input of the interrupt initiation switch as long as the current through the level shift switch is above a given threshold.

3. The half-bridge inverter as claimed in claim 2, wherein the interrupt initiation switch is a semiconductor switch with a working electrode, a reference electrode and a control electrode, the working electrode being coupled to the control output of the control module, the reference electrode being coupled to the control input of the lower half-bridge switch, and the control electrode being coupled, firstly, to the control output of the control module via a drive resistor and being coupled, secondly, to the time-delay switch.

4. The half-bridge inverter as claimed in claim 3, wherein a trapezoidal capacitor is coupled to the working electrode of the lower half-bridge switch, and the blocking of the control input of the interruption initiation switch is cancelled by an apparatus, which acquires the current through the trapezoidal capacitor, when the current flows from the working electrode of the lower half-bridge switch to the trapezoidal capacitor.

5. The half-bridge inverter as claimed in claim 2, wherein a trapezoidal capacitor is coupled to the working electrode of the lower half-bridge switch, and the blocking of the control input of the interruption initiation switch is cancelled by an apparatus, which acquires the current through the trapezoidal capacitor, when the current flows from the working electrode of the lower half-bridge switch to the trapezoidal capacitor.

6. The half-bridge inverter as claimed in claim 3, wherein the time-delay switch is a semiconductor switch with a working electrode, a reference electrode and a control electrode, the working electrode being coupled to the control input of the interrupt initiation switch, the reference electrode being coupled to the negative pole of the power supply via a current negative feedback network, and the control electrode being coupled to a current measuring apparatus that supplies at a measurement output a measuring signal that is proportional to the current through the level shift switch.

7. The half-bridge inverter as claimed in claim 6, wherein the series circuit of two diodes (D4, D5) is connected in parallel with the current negative feedback network, and a trapezoidal capacitor is connected between the connecting point of the diodes and the working electrode of the lower half-bridge switch, the diodes being polarized such that a current that flows from the working electrode of the lower half-bridge switch into the trapezoidal capacitor flows through the current negative feedback network.

8. The half-bridge inverter as claimed in claim 6, wherein a trapezoidal capacitor is coupled to the working electrode of the lower half-bridge switch, and the blocking of the control input of the interruption initiation switch is cancelled by an apparatus, which acquires the current through the trapezoidal capacitor, when the current flows from the working electrode of the lower half-bridge switch to the trapezoidal capacitor.

9. The half-bridge inverter as claimed in claim 6, wherein the current measuring apparatus includes at least one current negative feedback resistor that connects the level shift switch to the negative pole of the power supply, and the current measuring apparatus supplies at the measurement output a voltage whose root-mean-square value is proportional to the voltage across at least one current negative feedback resistor.

10. The half-bridge inverter as claimed in claim 9, wherein a trapezoidal capacitor is coupled to the working electrode of the lower half-bridge switch and the blocking of the control input of the interruption initiation switch is cancelled by an apparatus, which acquires the current through the trapezoidal capacitor, when the current flows from the working electrode of the lower half-bridge switch to the trapezoidal capacitor.

11. The half-bridge inverter as claimed in claim 9, wherein the series circuit of two diodes (D4, D5) is connected in parallel with the current negative feedback network, and a trapezoidal capacitor is connected between the connecting point of the diodes and the working electrode of the lower half-bridge switch, the diodes being polarized such that a current that flows from the working electrode of the lower half-bridge switch into the trapezoidal capacitor flows through the current negative feedback network.

12. The half-bridge inverter as claimed in claim 1, wherein a lamp is supplied with power via the half-bridge inverter.

* * * * *